(12) United States Patent
Yu et al.

(10) Patent No.: US 10,057,920 B2
(45) Date of Patent: Aug. 21, 2018

(54) PROXIMITY SERVICE CHANNEL ALLOCATION BASED ON RANDOM ACCESS CHANNEL PROCEDURE

(71) Applicant: NOKIA SOLUTIONS AND NETWORKS OY, Espoo (FI)

(72) Inventors: Ling Yu, Kauniainen (FI); Vinh Van Phan, Oulu (FI); Kari Veikko Horneman, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 189 days.

(21) Appl. No.: 15/119,953

(22) PCT Filed: Feb. 20, 2014

(86) PCT No.: PCT/EP2014/053316
§ 371 (c)(1),
(2) Date: Aug. 18, 2016

(87) PCT Pub. No.: WO2015/124185
PCT Pub. Date: Aug. 27, 2015

(65) Prior Publication Data
US 2017/0064736 A1    Mar. 2, 2017

(51) Int. Cl.
*H04W 72/14* (2009.01)
*H04W 76/14* (2018.01)
(Continued)

(52) U.S. Cl.
CPC .......... *H04W 72/14* (2013.01); *H04W 4/005* (2013.01); *H04W 4/70* (2018.02);
(Continued)

(58) Field of Classification Search
None
See application file for complete search history.

(56) References Cited

U.S. PATENT DOCUMENTS

| | | | |
|---|---|---|---|
| 2012/0129540 A1* | 5/2012 | Hakola | H04W 72/042 455/450 |
| 2012/0184306 A1* | 7/2012 | Zou | H04W 76/14 455/458 |

(Continued)

FOREIGN PATENT DOCUMENTS

| | | |
|---|---|---|
| WO | WO 02/01758 A1 | 1/2002 |
| WO | WO 2009/088872 A1 | 7/2009 |

(Continued)

OTHER PUBLICATIONS

International Search Report & Written Opinion dated Nov. 10, 2014 corresponding to International Patent Application No. PCT/EP2014/053316.

(Continued)

*Primary Examiner* — Brian Roberts
(74) *Attorney, Agent, or Firm* — Squire Patton Boggs (US) LLP

(57) ABSTRACT

Systems, methods, apparatuses, and computer program products for a random access channel (RACH) procedure based proximity-based service channel allocation are provided. One method includes controlling receiving, by a network node, a request for proximity-based service on a random access channel, the request being for at least one resource, and determining whether the requested at least one resource is allocable within a random access contention window. When the at least one resource is allocable, the method may include preparing a transmission of allocation information on a common control channel. When the at least one resource is not allocable, the method may include preparing a response for the request on the random access response channel, and preparing a transmission of allocation information either on common control channel or dedicated control channel.

17 Claims, 6 Drawing Sheets

(51) Int. Cl.
*H04W 4/70* (2018.01)
*H04W 74/08* (2009.01)
*H04W 76/02* (2009.01)
*H04W 4/00* (2018.01)

(52) U.S. Cl.
CPC ..... *H04W 74/0833* (2013.01); *H04W 76/023* (2013.01); *H04W 76/14* (2018.02)

(56) References Cited

U.S. PATENT DOCUMENTS

| | | | |
|---|---|---|---|
| 2013/0005377 A1* | 1/2013 | Wang | H04W 72/0406 455/509 |
| 2013/0155962 A1* | 6/2013 | Hakola | H04W 76/14 370/329 |
| 2014/0295868 A1* | 10/2014 | Lee | H04W 76/046 455/452.1 |

FOREIGN PATENT DOCUMENTS

| WO | WO 2011/036507 A1 | 3/2011 |
|---|---|---|
| WO | WO 2015/044183 A1 | 4/2015 |

OTHER PUBLICATIONS

3GPP TS 36.300 V12.0.0 (Dec. 2013), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Jan. 10, 2014, pp. 1-208, XP050729408.

3GPP TR 36.843 V0.1.0 (Apr. 2013), Technical Report, 3rd Generation Partnership Project; Technical Specification Group RAN; Study on LTE Device to Device Proximity services; (Release 12), Apr. 2013 (and cover sheet of R1-131717), 9 pages.

ETRI, "Fully scheduled D2D transmission in LTE-coverage," 3GPP Draft; R2-134095, 3GPP TSG-RAN WG2 #84, San Francisco, CA, USA, Nov. 11-15, 2013, XP050736894, 3 pages.

Huawei et al., "D2D Resource Allocation for In-Coverage Scenario," 3GPP Draft; R2-140227, 3GPP TSG RAN WG2 Meeting #85, Prauge, Czech, Feb. 10-14, 2014, XP050737452, 3 pages.

Vodafone et al., "Agreements from TSG RAN on work on Public Safety related use cases in Release 12," 3GPP Draft; RP-131377, TSG RAN Meeting #61, Porto, Portugal, Sep. 3-6, 2013, 6 pages.

\* cited by examiner

PROXIMITY SERVICE CHANNEL ALLOCATION BASED ON RANDOM ACCESS CHANNEL PROCEDURE

BACKGROUND

Field

Certain embodiments generally relate to communication systems, and for example, to device-to-device (D2D) communication integrated into a communications network, such as long-term evolution (LTE) or long-term evolution advanced (LTE-A) cellular network specified by the 3rd Generation Partnership Project (3GPP).

Description of the Related Art

Two types of communication networks include cellular networks and ad-hoc networks. A cellular network is a radio network made up of one or more cells, where each cell is served by at least one centralized controller, such as a base station (BS), a Node B, or an evolved Node B (eNB). In a cellular network, a user equipment (UE) communicates with another UE via the centralized controller, where the centralized controller relays messages sent by a first UE to a second UE, and visa-versa. In contrast, in an ad-hoc network, a UE directly communicates with another UE, without the need of a centralized controller. Utilizing a cellular network versus an ad-hoc network has its benefits and drawbacks. For example, utilizing a cellular network over an ad-hoc network provides the benefit of easy physical resource control and interference control. However, utilizing a cellular network over an ad-hoc network also provides the drawback of inefficient physical resource utilization. For instance, additional physical resources may be required in a cellular network when the two UEs are close to each other, as compared to an ad-hoc network.

A hybrid network utilizes both a cellular mode and a device-to-device (D2D) transmission mode. In a hybrid network, a UE may choose to communicate either via a cellular mode or a D2D transmission mode. As an example, a hybrid network may allow UEs to communicate either via a cellular mode (i.e. via a centralized controller) or via a D2D transmission mode where the UEs may establish a direct channel which may or may not be under the control of a centralized controller. The UE and/or its controlling network may make this selection depending on which mode provides better overall performance. Thus, a hybrid network may improve total system performance over a cellular network or an ad-hoc network. However, in order to utilize a hybrid network, issues related to physical resource sharing and interference situations may need to be addressed.

In addition, proximity services (ProSe)/D2D discovery and communication is one of the ongoing study items for 3GPP Release 12 (Rel-12) standardization (as well as Release 13 and beyond). D2D scenarios that are currently being studied in 3GPP include D2D in network coverage, out of network coverage, and partial network coverage scenarios. For example, Public Safety (PS) 1-to-Multiple (1:M) D2D group communication in both out-of-coverage and in-coverage scenarios are a particular focus due to the potential public safety applications.

SUMMARY

One embodiment is directed to a method including controlling receiving, by a network node, a request for proximity-based service on a random access channel, the request being for at least one resource, and determining whether the requested at least one resource is allocable within a random access contention window. When the at least one resource is allocable, the method may further include preparing a transmission of allocation information on a common control channel. When the at least one resource is not allocable, the method may further include preparing a response for the request on the random access response channel, and preparing a transmission of allocation information either on common control channel or dedicated control channel.

Another embodiment is directed to an apparatus including at least one processor and at least one memory including computer program code. The at least one memory and the computer program code are configured, with the at least one processor, to cause the apparatus at least to control receiving a request for proximity-based service on a random access channel, the request being for at least one resource, and to determine whether the requested at least one resource is allocable within a random access contention window. When the at least one resource is allocable, the apparatus may be caused to prepare a transmission of allocation information on a common control channel. When the at least one resource is not allocable, the apparatus may be caused to prepare a response for the request on the random access response channel, and prepare a transmission of allocation information either on common control channel or dedicated control channel.

Another embodiment is directed to a computer program embodied on a computer readable medium. The computer program may be configured to control a processor to perform a method including controlling receiving, by a network node, a request for proximity-based service on a random access channel, the request being for at least one resource, and determining whether the requested at least one resource is allocable within a random access contention window. When the at least one resource is allocable, the method may further include preparing a transmission of allocation information on a common control channel. When the at least one resource is not allocable, the method may further include preparing a response for the request on the random access response channel, and preparing a transmission of allocation information either on common control channel or dedicated control channel.

Another embodiment is directed to an apparatus including means for controlling receiving a request for proximity-based service on a random access channel, the request being for at least one resource, and means for determining whether the requested at least one resource is allocable within a random access contention window. When the at least one resource is allocable, the apparatus may further include means for preparing a transmission of allocation information on a common control channel. When the at least one resource is not allocable, the apparatus may further include means for preparing a response for the request on the random access response channel, and means for preparing a transmission of allocation information either on common control channel or dedicated control channel.

Another embodiment is directed to a method including determining, by a device, a need for at least one resource for proximity-based service, controlling transmission of a resource request on a random access channel for the at least one resource, and monitoring feedback in response to the resource request. When resource allocation for the proximity-based service is obtained on a common control channel, the method may further include maintaining a current activity status. When a response to the resource request is obtained on a random access response channel, the method may further include remaining in a connected state for obtaining resource allocation for the proximity-based service. When a response to the resource request is not obtained, the method may further include controlling retransmission of the resource request on a random access channel after a back-off period of time.

Another embodiment is directed to an apparatus including at least one processor and at least one memory including computer program code. The at least one memory and the computer program code are configured, with the at least one processor, to cause the apparatus at least to determine a need for at least one resource for proximity-based service, control transmission of a resource request on a random access channel for the at least one resource, and monitor feedback in response to the resource request. When resource allocation for the proximity-based service is obtained on a common control channel, the apparatus may be caused to maintain a current activity status. When a response to the resource request is obtained on a random access response channel, the apparatus may be caused to remain in a connected state for obtaining resource allocation for the proximity-based service. When a response to the resource request is not obtained, the apparatus may be caused to control retransmission of the resource request on a random access channel after a back-off period of time.

Another embodiment is directed to a computer program embodied on a computer readable medium. The computer program may be configured to control a processor to perform a method including determining, by a device, a need for at least one resource for proximity-based service, controlling transmission of a resource request on a random access channel for the at least one resource, and monitoring feedback in response to the resource request. When resource allocation for the proximity-based service is obtained on a common control channel, the method may further include maintaining a current activity status. When a response to the resource request is obtained on a random access response channel, the method may further include remaining in a connected state for obtaining resource allocation for the proximity-based service. When a response to the resource request is not obtained, the method may further include controlling retransmission of the resource request on a random access channel after a back-off period of time.

Another embodiment is directed to an apparatus including means for determining a need for at least one resource for proximity-based service, means for controlling transmission of a resource request on a random access channel for the at least one resource, and means for monitoring feedback in response to the resource request. When resource allocation for the proximity-based service is obtained on a common control channel, the apparatus may further include means for maintaining a current activity status. When a response to the resource request is obtained on a random access response channel, the apparatus may further include means for remaining in a connected state for obtaining resource allocation for the proximity-based service. When a response to the resource request is not obtained, the apparatus may further include means for controlling retransmission of the resource request on a random access channel after a back-off period of time.

BRIEF DESCRIPTION OF THE DRAWINGS

For proper understanding of the invention, reference should be made to the accompanying drawings, wherein.

DETAILED DESCRIPTION

Figure 1:
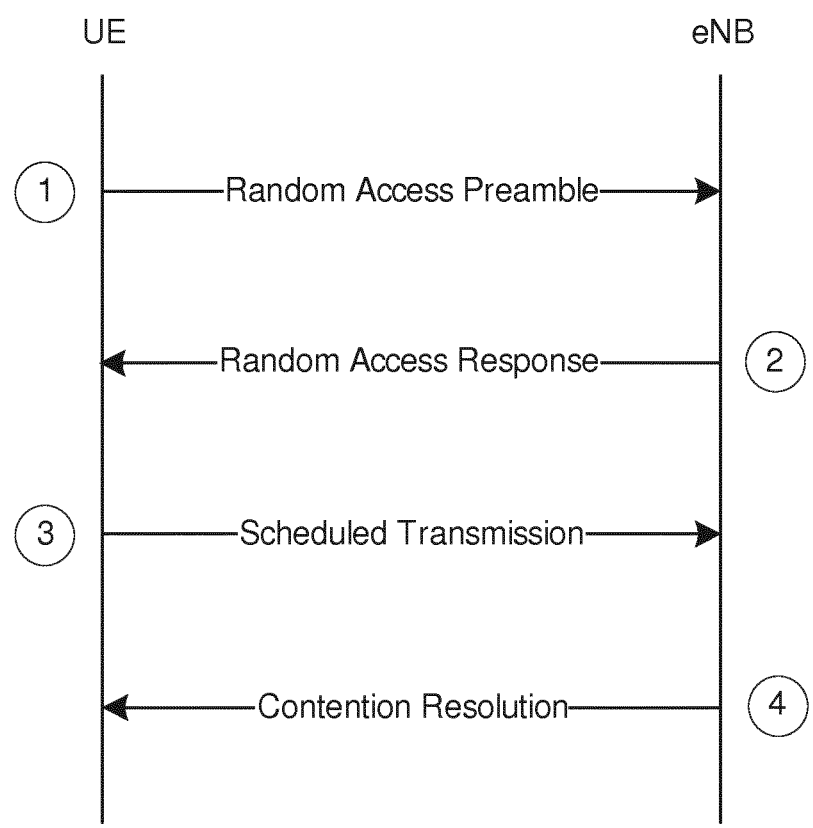
FIG. 1 illustrates an example contention based random access procedure.

It will be readily understood that the components of the invention, as generally described and illustrated in the figures herein, may be arranged and designed in a wide variety of different configurations. Thus, the following detailed description of the embodiments of systems, methods, apparatuses, and computer program products for a random access channel (RACH) procedure based proximity-based service channel allocation, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are applicable to LTE-Advanced, including 3GPP LTE-A Rel-12, Rel-13 and beyond, which addresses LTE-Advanced support for network-controlled D2D discovery and communication without limitation to LTE-Advanced. The 3GPP has begun carrying out a study for potential services and requirements for D2D communications, referred to as Proximity Services (ProSe). One objective of this study is to look at use cases and identify potential requirements for an operator network controlled discovery and communications between devices that are in proximity, under continuous network control, and/or are under 3GPP network coverage. This could be for the purposes of commercial/social use, network offloading, public safety, and/or integration of current infrastructure services to assure the consistency of the user experience including reachability and mobility aspects.

The use of a star-topology D2D cluster in which a selected device is taking a special role in coordinating and perhaps controlling possible D2D communications among cluster members is one of the approaches for supporting ProSe D2D communications. An example of how a D2D cluster may provide the broadcast based D2D communications includes the cluster head (CH) coordinating and allocating physical channel resources for cluster members to transmit for their requested individual user(s) or user group(s) within the cluster.

Network controlled D2D communication for in-network-coverage scenario has been considered. However, it has only been considered for either the evolved Node B (eNB) to coordinate D2D clusters within the cell or the eNB to act as D2D cluster head (CH) with new set of functions and operations of D2D CH. Reuse of current E-UTRAN functionalities to facilitate D2D functions and operations has been considered too, in which it requires D2D UEs to be kept in radio resource control (RRC) connected state in order to get the control from E-UTRAN for D2D operations. However, this will lead to waste of radio resource, high complexity and signaling overhead for establishing of RRC connection and maintaining active user equipment (UE) context and mobility management if D2D UEs have only D2D service without normal EPS service. Therefore, considering D2D UE requests resource allocation from eNB for D2D communication, it may be preferable to reuse random access (RA) procedure for contention based D2D channel allocation request when in E-UTRAN coverage instead of introducing another kind of contention based mechanism or establishing unnecessary RRC connection for the requesting UE. Therefore, embodiments of the present invention provide RA procedure based D2D channel allocation for the eNB to coordinate the resource allocation of D2D communication in in-coverage scenarios. In addition, it is noted that this approach may also be applied for out-of-coverage scenarios.

FIG. 1 illustrates an example contention based random access procedure in LTE. It should be appreciated, though, that FIG. 1 is presented herein only as an example and should not be taken as limiting the invention. For example, in future systems, random access messages may differ from those presented herein and user device activity statuses may not be limited to connected or idle. The same applies to other examples, too. In the example of FIG. 1, the four steps of the contention based random access procedures include: (1) Random Access Preamble on random access channel (RACH) in uplink, (2) Random Access Response generated by medium access control (MAC) on downlink shared channel (DL-SCH), (3) First scheduled uplink (UL) transmission on uplink shared channel (UL-SCH), and (4) Contention Resolution on downlink (DL).

For the Random Access Preamble on RACH in uplink (1), there are two possible groups defined where one is optional. If both groups are configured the size of message 3 and the pathloss is used to determine which group a preamble is selected from, the group to which a preamble belongs provides an indication of the size of the message 3 and the radio conditions at the UE. The preamble group information along with the necessary thresholds are broadcast on system information.

The Random Access Response generated by MAC on DL-SCH (2) may have the following characteristics: semi-synchronous (within a flexible window of which the size is one or more TTI) with message (1), no hybrid automatic repeat request (HARQ), addressed to Random Access Radio Network Temporary Identifier (RA-RNTI) on Physical Downlink Control Channel (PDCCH), conveys at least RA-preamble identifier, Timing Alignment information for the primary timing advance group (pTAG), initial UL grant and assignment of Temporary Cell Radio Network Temporary Identifier (C-RNTI) (which may or may not be made permanent upon contention resolution), and intended for a variable number of UEs in one DL-SCH message.

The first scheduled UL transmission on UL-SCH (3) may have the following characteristics: uses HARQ, the size of the transport blocks depends on the UL grant conveyed in message (2) and is at least 80 bits. For initial access, scheduled transmission (3) conveys the RRC Connection Request generated by the RRC layer and transmitted via common control channel (CCCH) and at least non-access stratum (NAS) UE identifier but no NAS message, and radio link control (RLC) transparent mode (TM) has no segmentation. For RRC Connection re-establishment procedure, scheduled transmission (3) conveys the RRC Connection re-establishment request generated by the RRC layer and transmitted via CCCH, RLC TM has no segmentation, and does not contain any NAS message. After handover, in the target cell, scheduled transmission (3) conveys the ciphered and integrity protected RRC Handover Confirm generated by the RRC layer and transmitted via dedicated control channel (DCCH), conveys the C-RNTI of the UE (which was allocated via the Handover Command), and includes an uplink Buffer Status Report when possible. For other events, scheduled transmission (3) conveys at least the C-RNTI of the UE.

For contention resolution message (4), early contention resolution shall be used, i.e., eNB does not wait for NAS reply before resolving contention. It is not synchronized with message 3 and HARQ is supported. It is addressed to: the Temporary C-RNTI on physical downlink control channel (PDCCH) for initial access and after radio link failure; and/or the C-RNTI on PDCCH for UE in RRC CONNECTED. HARQ feedback is transmitted only by the UE which detects its own UE identity, as provided in message (3), echoed in the contention resolution message (4). For initial access and RRC Connection re-establishment procedure, no segmentation is used in RLC layer, i.e. RLC transparent mode (RLC-TM) is used.

The Temporary C-RNTI is promoted to C-RNTI for a UE which detects RA success and does not already have a C-RNTI; it is dropped by others. A UE which detects random access (RA) success and already has a C-RNTI, resumes using its C-RNTI.

Certain embodiments of the invention, considering eNB as D2D CH to coordinate the channel allocation for D2D broadcast and group communication for in-network-coverage scenario, provide a variation of the RA procedure in E-UTRAN for D2D UE to request D2D channel allocation from eNB without unnecessary RRC connection establishment.

In this embodiment, the eNB may act as the D2D CH to coordinate the D2D channel allocation for D2D communication within the cell. In this scenario, a D2D UE may detect the need for D2D transmission but without valid means to request UL resource allocation for sending a D2D channel allocation request (e.g., when the D2D UE is in RRC idle state or in RRC connected state with UL synchronization status as "non-synchronized").

Figure 2A:
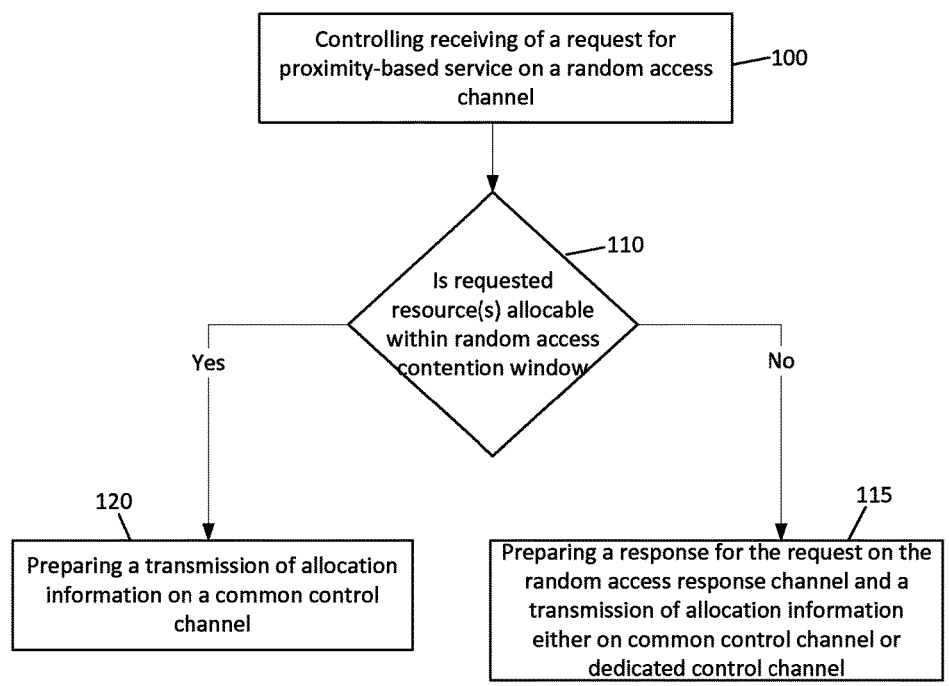
FIG. 2a illustrates a flow chart of a method according to one embodiment.

FIG. 2a illustrates a flow chart of a method, according to an embodiment. The method of FIG. 2a may be carried out by a node, server or host facilitating proximity-based services, for example for a cluster of user devices. Proximity-based services may include device-to-device (D2D) communications, proximity services (ProSe), machine type communications (MTC), such a cyber physical systems or Internet of things, etc. or any combination thereof.

As illustrated in FIG. 2a, at block 100, the method includes controlling receiving of a request for proximity-based service on a random access channel. The request may be for at least one resource.

According to an embodiment, a D2D UE may utilize RACH procedure to request D2D resource allocation from a serving eNB. The D2D UE can use, for example, msg3 in RA procedure to deliver the pre-configured UE ID and optional group ID for D2D communication as a D2D channel allocation request. In certain embodiments, the D2D channel allocation request can be introduced either as MAC control signaling or a RRC control message.

In the example of FIG. 2a, at block 110, it is determined whether the requested at least one resource is allocable within a random access contention window.

In general, in contention based random access, any device in the network can transmit random access preamble probably followed by data transmission at configured time instance. The overlapping transmission (i.e. collision) of random access preamble and data may occur. In order to resolve the collision, contention resolution message needs to be provided to the random access device within certain time period. A contention window defines the period of time during which the contention resolution message is expected by the random access device after transmitting random access preamble or data. The contention based random access configuration and contention window size may be controlled by a node supporting the service at issue.

According to an embodiment, the determination of whether the requested at least one resource is allocable within the random access contention window may be carried out by finding out at least one of the following: weather there is available D2D resources to be allocated and whether a user device requesting the at least one resource is in connected state and/or security functions of the proximity-based service are under the control of the network node. This enables quick authentication of the D2D UE and the prompt availability of D2D resources. For instance, quick authentication may be possible if the D2D UE is in RRC connected state before requesting the D2D resource or D2D security server/agent functions are located in eNB or within the radio access network that is under control of the eNB.

According to an embodiment, upon receiving a D2D resource request using RACH from a D2D UE, the eNB determines if the requested D2D resource can be allocated within RACH contention window and determines whether there is a need for RRC connection establishment for the D2D UE. For an example of D2D resource availability, the requested D2D resource may not be available immediately when the eNB receives a D2D resource request from the D2D UE. However, if the requesting D2D UE has higher priority to use the resources, the eNB may coordinate the usage of D2D resource(s) in such way that other lower priority D2D UEs or D2D group may be requested to release certain D2D resource(s) for the requesting D2D UE. In this case, the requested D2D resource may be allocated only after low priority D2D UEs/group releases the resource as requested.

As depicted in FIG. 2a, at block 115, when it is determined that the at least one resource is allocable, a transmission of allocation information on a common control channel is prepared. In one embodiment, the transmission of allocation information on a common control channel is carried out as a contention resolution of a random access procedure. In other words, if the requested D2D resource can be allocated within RACH contention window, the eNB may transmit D2D resource allocation on the pre-configured D2D common control channel, which can also be used as contention resolution message towards the D2D UE requesting the D2D resource with RACH procedure. Therefore, msg 4 of RACH procedure for contention resolution may be skipped in this case.

Returning to FIG. 2a, when the at least one resource is not allocable, at block 120, a response for the request on the random access response channel is prepared, and a transmission of allocation information either on common control channel or dedicated control channel is prepared. In an embodiment, if the D2D UE requesting the at least one resource is in idle state, the preparing of the response for the request on the random access response channel may further comprise including a radio resource connection setup in the response. In one embodiment, the radio resource connection setup or the response for the request on the random access response channel may further comprise allocation information and then the preparing of a transmission of allocation information either on the common control channel or the dedicated control channel is not carried out.

If requested D2D resource cannot be allocated within RACH contention window, the eNB may transmit RACH response message to keep the D2D UE into RRC connected state. The D2D resource allocation may be transmitted to the D2D UE later on either on pre-configured D2D common control channel or with dedicated signaling.

In one embodiment, if the eNB determines that there is a need for establishing a RRC connection for RRC idle mode D2D UE (e.g., when the eNB wants to coordinate/control D2D group communication to a certain extent and uses the RRC connected mode D2D UE to communicate the coordination/control messages to the D2D group or some dynamic D2D channel allocation using dedicated RRC signaling is preferred), the eNB may include a RRC connection setup message in a RACH response message sent to the D2D UE, in which D2D resource allocation may or may not be included.

The eNB being able to allocate resources to D2D UE despite the UE's status of activity (e.g., connected/idle mode) achieves certain advantages, such as reducing radio resource consumption, complexity and signaling overhead (which are otherwise needed in order to establish and maintain active UE contexts and mobility connections for UEs). This in turn improves radio network capacity and energy efficiency.

Figure 2B:
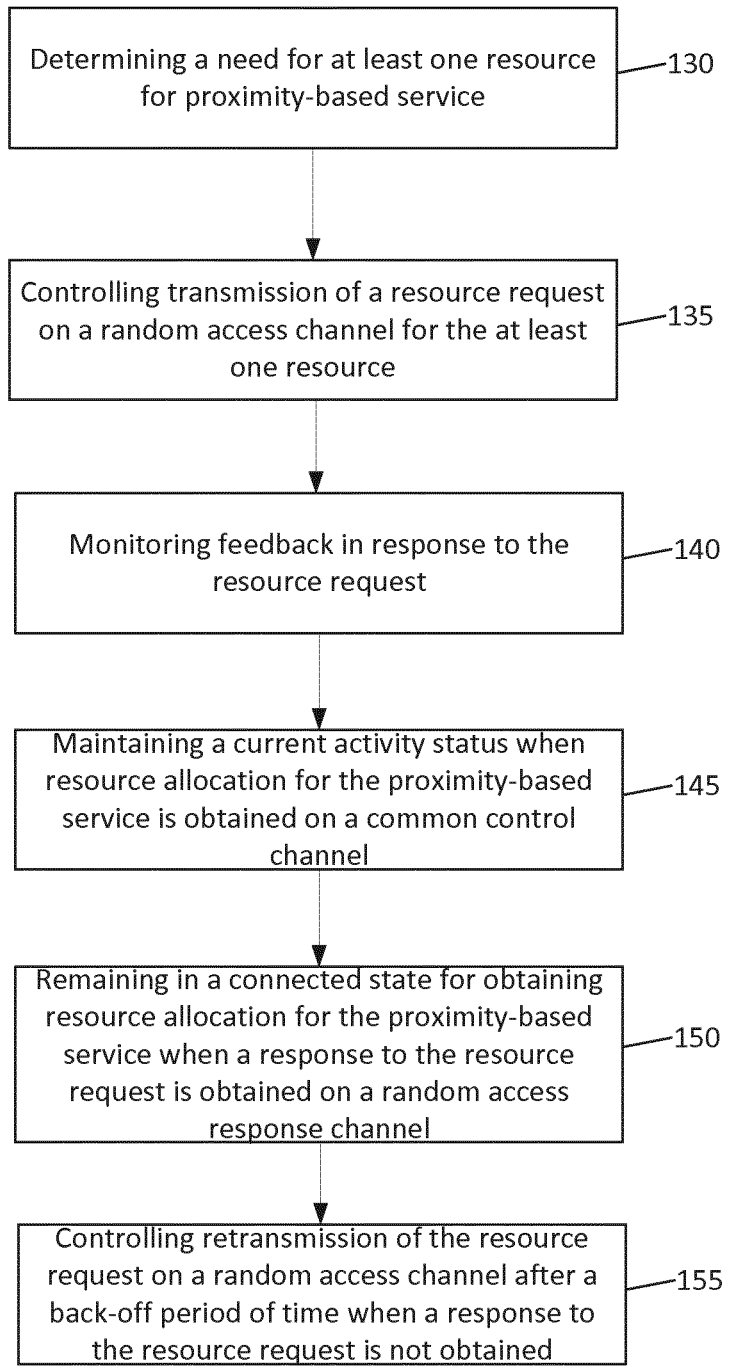
FIG. 2b illustrates a flow chart of a method according to another embodiment.

FIG. 2b illustrates a flow chart of a method, according to another embodiment. In one embodiment, the method of FIG. 2b may be carried out by a user device for proximity-based services. Proximity-based services may include device-to-device (D2D) communications, proximity services (ProSe), machine type communications (MTC), such as cyber physical systems or Internet of things, etc. or any combination thereof.

As illustrated in FIG. 2b, at block 130, the method may include determining a need for at least one resource for proximity-based service. The determination may be based, for example, on a need to transmit a video clip or an e-mail.

At block 135, transmission of a resource request on a random access channel for the at least one resource is controlled.

According to an embodiment, a D2D UE may utilize RACH procedure to request D2D resource allocation from a serving eNB. The D2D UE can use, for example, msg3 in RA procedure to deliver the pre-configured UE ID and optional group ID for D2D communication as a D2D channel allocation request. In certain embodiments, the D2D channel allocation request can be introduced either as MAC control signaling or a RRC control message.

At block 140, feedback in response to the resource request is monitored. Both a common control channel and random access response channel may be monitored.

In an embodiment, upon transmitting a D2D resource request, the D2D UE may need to monitor feedback from eNB for possible D2D resource allocation and/or RACH response within RACH contention window. For example, the D2D UE may monitor both PDCCH for scheduling information of msg4 as RACH response and the update of D2D common control channel for D2D channel allocation response.

At block 145, a current activity status is maintained, when resource allocation for the proximity-based service is obtained on a common control channel. The maintaining of the status may be based on regarding resource allocation on the common control channel as a contention resolution. Thus, the user device does not have to monitor a separate contention resolution message (msg4) from random access response channel.

In one embodiment, if D2D resource allocation is received from the eNB on the pre-configured D2D common control channel, the D2D UE considers it succeeded in contention based RACH procedure and can remain in the same RRC state as it was before initiating RACH procedure. In this case, the D2D UE can start the transmission for D2D broadcast/group communication on allocated D2D channel(s) based on D2D channel allocation information provided by updated D2D common control channel.

As illustrated in FIG. 2b, at block 150, when a response to the resource request is obtained on a random access response channel, the D2D UE remains in a connected state for obtaining resource allocation for the proximity-based service.

In one embodiment, if a RACH response, either with or without D2D resource allocation, is received from the eNB, the D2D UE stays in RRC connected state for further communication with the eNB. If the D2D UE was in RRC idle state before initiating RACH procedure, the D2D UE may need to establish RRC connection with the eNB as commanded in RACH response message. If D2D resource allocation is not included in RACH response message, the D2D UE may get D2D resource allocation later either on pre-configured D2D common control channel or on the dedicated control channel, which may happen out of RACH contention window.

Referring again to FIG. 2b, at block 155, retransmission of the resource request on a random access channel after a back-off period of time is controlled, when a response to the resource request is not obtained.

If nothing is received within RACH contention window, the D2D UE may reattempt sending the D2D resource request utilizing RACH procedure after a back-off time period. The back-off time period may be set by a controlling node.

A benefit of allowing D2D UE to remain in current state (especially idle) while receiving D2D allocation are to reduce radio resource consumption, complexity and signaling overhead (which are otherwise needed in order to establish and maintain active UE contexts and mobility connections for UEs). This in turn improves radio network capacity and energy efficiency.

Figure 3:
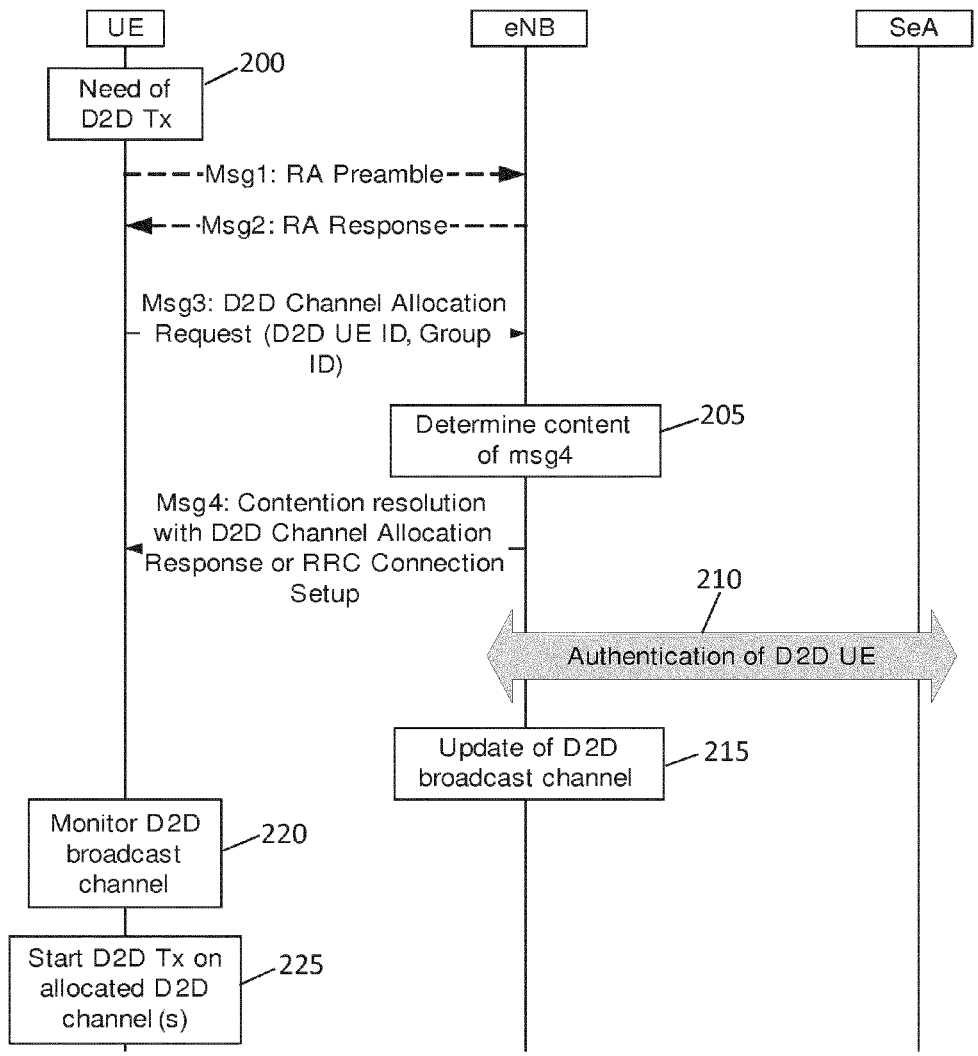
FIG. 3 illustrates a signaling diagram depicting an embodiment of a method for a random access procedure based D2D channel allocation.

FIG. 3 illustrates an example signaling diagram of a RA procedure based D2D channel allocation with eNB, according to one embodiment. In this example, the eNB acts as the D2D CH to coordinate the D2D channel allocation for D2D communication within the cell. When D2D UE detects, at 200, the need for D2D transmission but without valid means to request UL resource allocation for sending D2D Channel Allocation Request (e.g., when D2D UE in RRC idle state or in RRC connected state with UL synchronization status as "non-synchronized"), a RA procedure will be initiated. The normal RA Preamble (Msg1) and RA Response (Msg2) as currently specified in LTE may be used in this case. However, if D2D channel allocation as the cause of RA is beneficial to be indicated to the eNB, some specific RA preambles or preamble group may be pre-configured for D2D UEs to request D2D channel allocation.

In the example of FIG. 3, the D2D UE uses msg3 in RA procedure to deliver the pre-configured UE ID and optional group ID for D2D communication as a D2D channel allocation request. Upon receiving msg3, at 205, the eNB may determine the content of msg4. In order to allow unsuccessful D2D UE in contention to try again within a certain time limit, msg4 of contention resolution may be sent before the eNB authenticates the D2D UE with the D2D security server/agent (SeA) at 210. If the requested D2D UE is authenticated by the SeA and the eNB has available D2D channels resource to allocate, the eNB may, at 215, update the D2D broadcast channel to confirm the channel allocation. The updated channel allocation information may be used by the requested D2D UE as the response of D2D channel allocation and by corresponding D2D group member to monitor, at 220, the allocated D2D channel(s) for receiving D2D communication packets. It may also be used by the requested D2D UE as contention resolution if msg4 is skipped by eNB. At 225, the D2D UE may start D2D transmission on the allocated D2D channel(s).

It is noted that at least some embodiments may be applied for the case having eNB with broken S1 to assist D2D communications.

The steps/points, signaling messages and related functions described above in FIGS. 2a, 2b, and 3 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

Figure 4A:
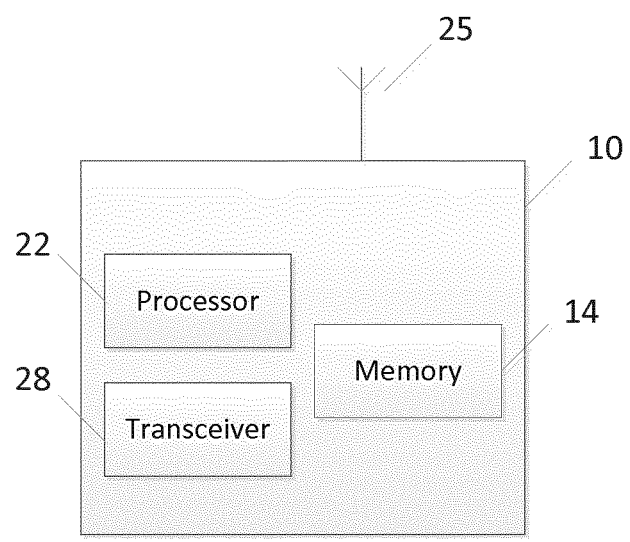
FIG. 4a illustrates an apparatus according to one embodiment.

FIG. 4a illustrates an example of an apparatus 10 according to an embodiment. In an embodiment, apparatus 10 may be a node, host, server, and/or base station in a communications network or serving such a network, such as an evolved node B (eNB) in LTE or LTE-A. It should be noted that one of ordinary skill in the art would understand that apparatus 10 may include components or features not shown in FIG. 4a.

As illustrated in FIG. 4a, apparatus 10 may include a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further comprise or be coupled to a memory 14 (internal or external), which may be coupled to processor 22, for storing information and/or instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. Instructions (which may be stored in memory 14) may include program instructions or computer program code or computer program code portions that, when executed by processor 22, for example, enable the apparatus 10 to perform tasks as described herein. The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

Apparatus 10 may also comprise or be coupled to one or more antennas 25 for transmitting and receiving signals and/or data to and from apparatus 10. Apparatus 10 may further comprise or be coupled to a transceiver 28 configured to transmit and receive information. The transceiver may be an external device, such as a remote radio head. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a server, network node, host or base station in a communications network or serving such a network. In this example embodiment, apparatus 10 may be an eNB as discussed above. In one embodiment, apparatus 10 may be controlled by memory 14 and processor 22 to receive a D2D resource request using RACH from a D2D UE. According to an embodiment, the D2D resource request may be received in msg3 of random access (RA) procedure. Apparatus 10 may then be controlled by memory 14 and processor 22 to determine if the D2D resource can be allocated within the RACH contention window. In one embodiment, if the D2D resource can be allocated within RACH contention window, apparatus 10 may be controlled by memory 14 and processor 22 to prepare a transmission of allocation information using a common control channel.

According to certain embodiments, if the D2D resource cannot be allocated within RACH contention window, apparatus 10 may be controlled by memory 14 and processor 22 to prepare a RACH response (for enabling UE to stay in connected mode) and prepare a transmission of allocation information using either a common control channel or dedicated control channel.

According to an embodiment, when apparatus 10 determines that a RRC connection for D2D UE should be established, apparatus 10 may be controlled by memory 14 and processor 22 to include a RRC connection setup message in RACH response message to D2D UE, in which D2D resource allocation may or may not be included.

In certain embodiments, apparatus 10 may be controlled by memory 14 and processor 22 to contact a security server to authenticate the D2D UE, and to receive a D2D group security context comprising authentication information for each individual group member by the security server if no security risk is identified. In one embodiment, the security server may be a D2D security server/agent (SeA).

Figure 4B:
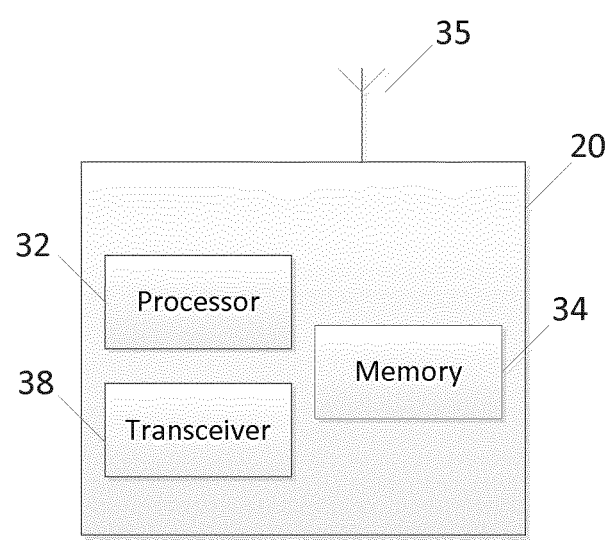
FIG. 4b illustrates an apparatus according to another embodiment.

FIG. 4*b* illustrates an example of an apparatus 20 according to an embodiment. In an embodiment, apparatus 20 may be a device or node in a communications network, such as a user device (which may also be called UE, user equipment, user terminal, terminal device, etc.). The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, phablet, game console, notebook, and multimedia device. It should be appreciated that a user device may also be a nearly exclusive uplink only device, of which an example is a camera or video camera loading images or video clips to a network.

It should be noted that one of ordinary skill in the art would understand that apparatus 20 may include components or features not shown in FIG. 4*b*.

As illustrated in FIG. 4*b*, apparatus 20 may include a processor 32 for processing information and executing instructions or operations. Processor 32 may be any type of general or specific purpose processor. While a single processor 32 is shown in FIG. 4*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further comprise or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. Instructions (which may be stored in memory 34) may include program instructions or computer program code or computer program code portions that, when executed by processor 32, enable the apparatus 20 to perform tasks as described herein. The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

Apparatus 20 may also comprise or be coupled to one or more antennas 35 for transmitting and receiving signals and/or data to and from apparatus 20. Apparatus 20 may further comprise or be coupled to a transceiver 38 configured to transmit and receive information. The transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a device or node in a communications network. In this example embodiment, apparatus 20 may be a user device. In one embodiment, apparatus 20 may be controlled by memory 34 and processor 32 to determine the need for a D2D resource, and to transmit a D2D resource request utilizing RACH procedure to an eNB. In one embodiment, the resource request may be included in msg3 in RA procedure and/or in a D2D channel allocation request. In an embodiment, the resource request may comprise a D2D UE identity and/or a group identity.

According to one embodiment, memory 34 and processor 32 may control apparatus 20 to monitor feedback from the eNB in response to the D2D resource request. If D2D resource allocation is received from the eNB on a D2D common control channel, memory 34 and processor 32 may control apparatus 20 to maintain its activity status (e.g., connected or idle). In an embodiment, if apparatus 20 receives a RACH response either with or without resource allocation, apparatus 20 may be controlled by memory 34 and processor 32 to remain in connected state with the eNB for further communication. According to one embodiment, if no allocation is received, apparatus 20 may be controlled by memory 34 and processor 32 to reattempt sending the D2D resource request utilizing RACH procedure after a back-off time period.

In one embodiment, when the eNB determines that RRC connection should be established for apparatus 20, apparatus 20 may be controlled by memory 34 and processor 32 to receive a RRC connection setup message to trigger apparatus 20 to establish RRC connection with the eNB. Accordingly, in this embodiment, apparatus 20 may be controlled by memory 34 and processor 32 to establish the RRC connection with the eNB according to the RRC connection setup message.

According to certain embodiments, apparatus 20 may be controlled by memory 34 and processor 32 to start transmission for D2D broadcast communication on the D2D channel allocation and configuration received from the eNB. In an embodiment, apparatus 20 may be further controlled by memory 34 and processor 32 to receive an activation time instance indicating an earliest starting time the allocated D2D channel may be taken into use for the transmission.

Figure 5A:
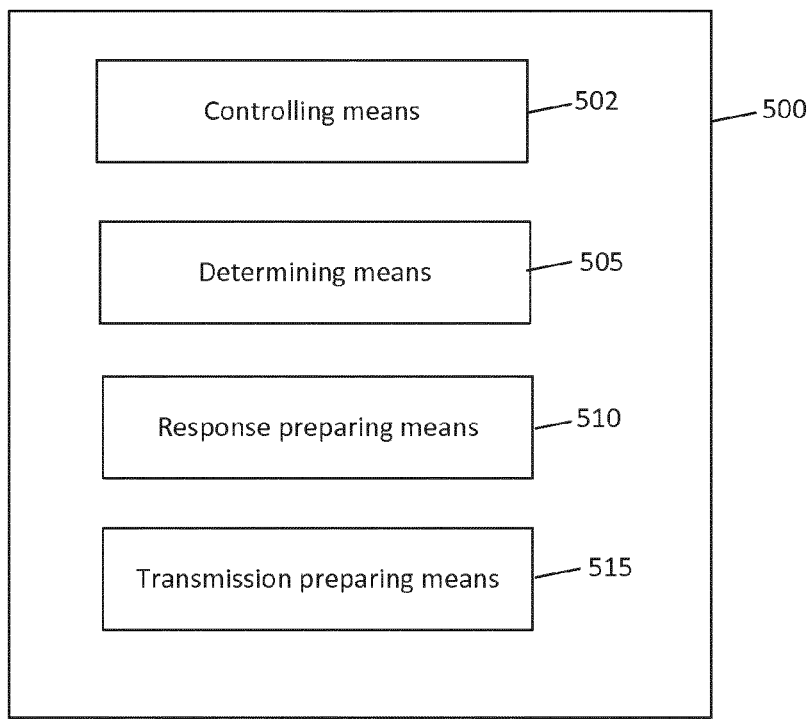
FIG. 5a illustrates a block diagram of an apparatus according to an embodiment.

FIG. 5*a* illustrates an exemplifying block diagram of an apparatus 500 according to another embodiment. It should be understood that an apparatus may also be similar to the apparatus of FIG. 4*a* or it may a processor, control unit or alike.

Apparatus 500 may include means 502 (22) for controlling receiving a request for proximity-based service on a random access channel. The request may be for at least one resource. Apparatus 500 (22) may also include means 505 (22) for determining whether the requested at least one resource is allocable within a random access contention window. Apparatus 500 may further include means 510 (22) for preparing a transmission of allocation information on a common control channel, when it is determined that the at least one resource is allocable. Apparatus 500 may include means 515 (22) for preparing a response for the request on the random access response channel and for preparing a transmission of allocation information either on a common control channel or dedicated control channel, when it is determined that the at least one resource is not allocable.

Figure 5B:
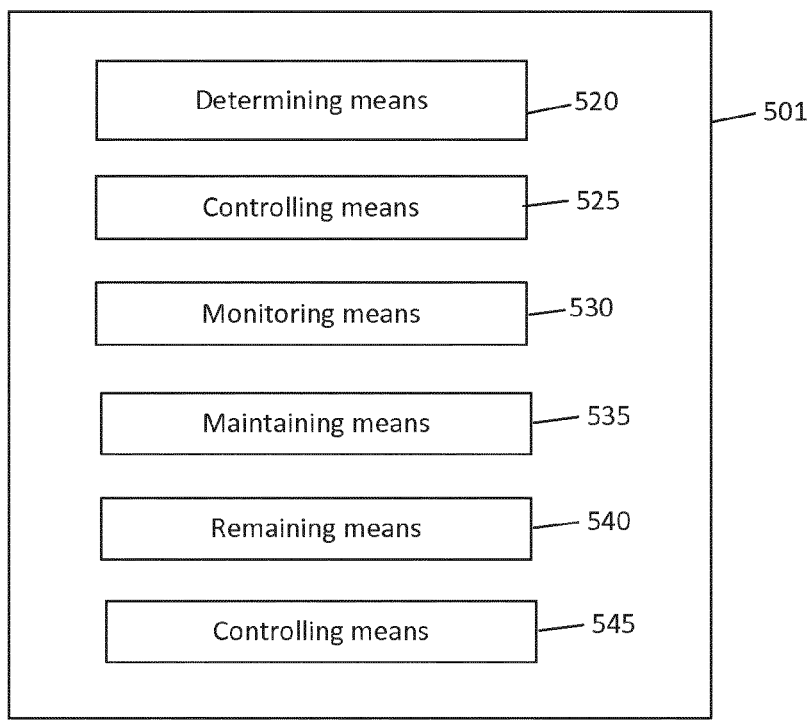
FIG. 5b illustrates a block diagram of an apparatus according to another embodiment.

FIG. 5*b* illustrates an exemplifying block diagram of an apparatus 501, according to another embodiment. It should be understood that an apparatus may also be similar to the apparatus of FIG. 4*b* or it may a processor, control unit or alike.

Apparatus 501 may include means 520 (32) for determining a need for at least one resource for proximity-based service. Apparatus 501 may further include means 525 (32) for controlling transmission of a resource request on a random access channel for the at least one resource. According to one embodiment, apparatus 501 may also include means 530 (32) for monitoring feedback in response to the resource request. Apparatus 501 may include means 535 (32) for maintaining a current activity status, when resource allocation for the proximity-based service is obtained on a common control channel. Apparatus 501 may include means 540 (32) for remaining in a connected state for obtaining resource allocation for the proximity-based service, when a response to the resource request is obtained on a random access response channel. Apparatus 501 may include means 545 (32) for controlling retransmission of the resource request on a random access channel after a back-off time period, when a response to the resource request is not obtained.

It should be appreciated that an apparatus may include or otherwise be in communication with a control unit, one or more processors or other entities capable of carrying out operations according to the embodiments described by means of FIGS. 2a and 2b. It should be understood that each block of the flowchart of FIG. 2a or 2b and any combination thereof may be implemented by various means or their combinations, such as hardware, software, firmware, one or more processors and/or circuitry.

In some embodiments, the functionality of any of the methods described herein, such as that illustrated in FIG. 2a, 2b, or 3 discussed above, may be implemented by software and/or computer program code or computer program code portions stored in memory or other computer readable or tangible media, and executed by a processor. In other embodiments, the functionality may be performed by hardware or combination of software and hardware, for example through the use of an application specific integrated circuit (ASIC), a programmable gate array (PGA), a field programmable gate array (FPGA), etc.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
controlling receiving, by a network node, a request for proximity-based service on a random access channel, the request being for at least one resource;
determining whether the requested at least one resource is allocable within a random access contention window;
when the at least one resource is allocable,
preparing a transmission of allocation information on a common control channel,
when the at least one resource is not allocable,
preparing a response for the request on the random access response channel, and
preparing a transmission of allocation information either on common control channel or dedicated control channel.

2. The method according to claim 1, wherein the determining comprises determining at least one of the following: whether a user device requesting the at least one resource is in connected state and security functions of the proximity-based service are under the control of the network node.

3. The method according to claim 1, wherein the preparing of the transmission of allocation information on the common control channel is carried out as a contention resolution of a random access procedure.

4. The method according to claim 1, wherein the request for proximity-based service is received in msg3 of random access (RA) procedure.

5. The method according to claim 1, wherein, if a user device requesting the at least one resource is in idle state, the preparing of the response for the request on the random access response channel further comprises including a radio resource connection setup into the response.

6. The method according to claim 1, wherein the radio resource connection setup or the response for the request on the random access response channel further comprises allocation information and the preparing a transmission of allocation information either on common control channel or dedicated control channel is not carried out.

7. An apparatus, comprising:
at least one processor; and
at least one memory including computer program code,
wherein the at least one memory and the computer program code are configured, with the at least one processor, to cause the apparatus at least to
control receiving a request for proximity-based service on a random access channel, the request being for at least one resource;
determine whether the requested at least one resource is allocable within a random access contention window;
when the at least one resource is allocable,
prepare a transmission of allocation information on a common control channel,
when the at least one resource is not allocable,
prepare a response for the request on the random access response channel, and
prepare a transmission of allocation information either on common control channel or dedicated control channel.

8. The apparatus according to claim 7, wherein the at least one memory and the computer program code are further configured, with the at least one processor, to cause the apparatus at least to determine at least one of the following: whether a user device requesting the at least one resource is in connected state and security functions of the proximity-based service are under the control of the network node.

9. The apparatus according to claim 7, wherein the preparing of the transmission of allocation information on the common control channel is carried out as a contention resolution of a random access procedure.

10. The apparatus according to claim 7, wherein the request for proximity-based service is received in msg3 of random access (RA) procedure.

11. The apparatus according to claim 7, wherein, if a user device requesting the at least one resource is in idle state, the at least one memory and the computer program code are further configured, with the at least one processor, to cause the apparatus at least to prepare the response for the request on the random access response channel by including a radio resource connection setup into the response.

12. The apparatus according to claim 7, wherein the radio resource connection setup or the response for the request on the random access response channel further comprises allocation information and the preparing a transmission of allocation information either on common control channel or dedicated control channel is not carried out.

13. A method, comprising:
determining, by a device, a need for at least one resource for proximity-based service;
controlling transmission of a resource request on a random access channel for the at least one resource,
wherein the resource request is transmitted in msg3 in random access (RA) procedure,
wherein the resource request comprises at least one of the following: a user identity or group identity;

monitoring feedback in response to the resource request,
wherein the monitoring comprises monitoring both the common control channel and random access response channel;
when resource allocation for the proximity-based service is obtained on a common control channel,
maintaining a current activity status,
wherein the current activity status comprises one of: connected or idle;
when a response to the resource request is obtained on a random access response channel,
remaining in a connected state for obtaining resource allocation for the proximity-based service;
when a response to the resource request is not obtained,
controlling retransmission of the resource request on a random access channel after a back-off period of time.

14. The method according to claim 13, wherein the maintaining of the current activity status is based on regarding resource allocation on the common control channel as a contention resolution.

15. An apparatus, comprising:
at least one processor; and
at least one memory including computer program code,
wherein the at least one memory and the computer program code are configured, with the at least one processor, to cause the apparatus at least to
determine a need for at least one resource for proximity-based service;
control transmission of a resource request on a random access channel for the at least one resource,
wherein the resource request is transmitted in msg3 in random access (RA) procedure,
wherein the resource request comprises at least one of the following: a user identity or group identity;
monitor feedback in response to the resource request;
wherein the monitoring comprises monitoring both the common control channel and random access response channel,
when resource allocation for the proximity-based service is obtained on a common control channel,
maintain a current activity status,
wherein the current activity status comprises one of: connected or idle;
when a response to the resource request is obtained on a random access response channel,
remain in a connected state for obtaining resource allocation for the proximity-based service;
when a response to the resource request is not obtained,
control retransmission of the resource request on a random access channel after a back-off period of time.

16. The apparatus according to claim 15, wherein apparatus comprises a D2D user device.

17. The apparatus according to claim 15, wherein the maintaining of the current activity status is based on regarding resource allocation on the common control channel as a contention resolution.

* * * * *